US011187868B2

(12) United States Patent
Feng et al.

(10) Patent No.: US 11,187,868 B2
(45) Date of Patent: Nov. 30, 2021

(54) LENS ASSEMBLY AND ELECTRONIC DEVICE HAVING SAME

(71) Applicant: HON HAI PRECISION INDUSTRY CO., LTD., New Taipei (TW)

(72) Inventors: Ya-Lan Feng, New Taipei (TW); Chun-Cheng Ko, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 133 days.

(21) Appl. No.: 16/578,643

(22) Filed: Sep. 23, 2019

(65) Prior Publication Data

US 2020/0233173 A1 Jul. 23, 2020

(30) Foreign Application Priority Data

Jan. 23, 2019 (CN) .......................... 201910065218.8

(51) Int. Cl.
*G02B 5/00* (2006.01)
*G02B 7/02* (2021.01)
*G02B 9/60* (2006.01)
*G02B 13/18* (2006.01)
*G02B 7/00* (2021.01)

(52) U.S. Cl.
CPC ............. *G02B 7/021* (2013.01); *G02B 5/003* (2013.01); *G02B 7/006* (2013.01); *G02B 7/026* (2013.01); *G02B 9/60* (2013.01); *G02B 13/18* (2013.01)

(58) Field of Classification Search
CPC ........ G02B 7/021; G02B 7/026; G02B 5/003; G02B 9/60; G02B 13/18; G02B 7/006; G02B 13/0045; G02B 7/00; G02B 7/02; G02B 5/005; G02B 7/022; G02B 7/023; G02B 7/025; G02B 5/00

USPC ......................................................... 359/601
See application file for complete search history.

(56) References Cited

U.S. PATENT DOCUMENTS

2018/0348479 A1* 12/2018 Kasama ............ G02B 27/0018

FOREIGN PATENT DOCUMENTS

JP 2019164253 * 9/2019 ......... G02B 13/0045
TW 201825999 A * 7/2018 ............. G03B 11/04

OTHER PUBLICATIONS

Machine Translation of JP2019164253 (Year: 2019).*
Machine Translation of TW201825999A (Year: 2018).*

* cited by examiner

*Primary Examiner* — Darryl J Collins
*Assistant Examiner* — Matthew Y Lee
(74) *Attorney, Agent, or Firm* — ScienBiziP, P.C.

(57) ABSTRACT

A lens assembly includes a lens barrel, a lens group, a gasket, and a light shielding group. The lens group includes a number of lenses. The light shielding group includes a number of shielding sheets defining a through hole. The gasket is located between two lenses on a light exiting side of the lens assembly. An inner portion of the gasket defines an inner hole for transmitting light. An aperture of the inner hole increases from an object side of the lens assembly to an image side of the lens assembly. An aperture D1 of the through hole adjacent to the gasket and adjacent to the object side, an aperture D2 of the inner hole adjacent to the object side, and an aperture D3 of the through hole adjacent to the gasket and adjacent to the image side satisfy a relationship $0.65 < D1/D2 < 0.85$; and $D3 \leq D2$.

14 Claims, 6 Drawing Sheets

LENS ASSEMBLY AND ELECTRONIC DEVICE HAVING SAME

FIELD

The subject matter herein generally relates to lens assemblies, and more particularly to a lens assembly of an electronic device.

BACKGROUND

Generally, lens assemblies use a gasket to maintain a gap between lenses. However, stray light is reflected by an inner diameter of the gasket and is transmitted directly through the lens closest to an image sensor, which adversely affects quality of images.

BRIEF DESCRIPTION OF THE DRAWINGS

Implementations of the present disclosure will now be described, by way of embodiments, with reference to the attached figures.

DETAILED DESCRIPTION

Figure 1:
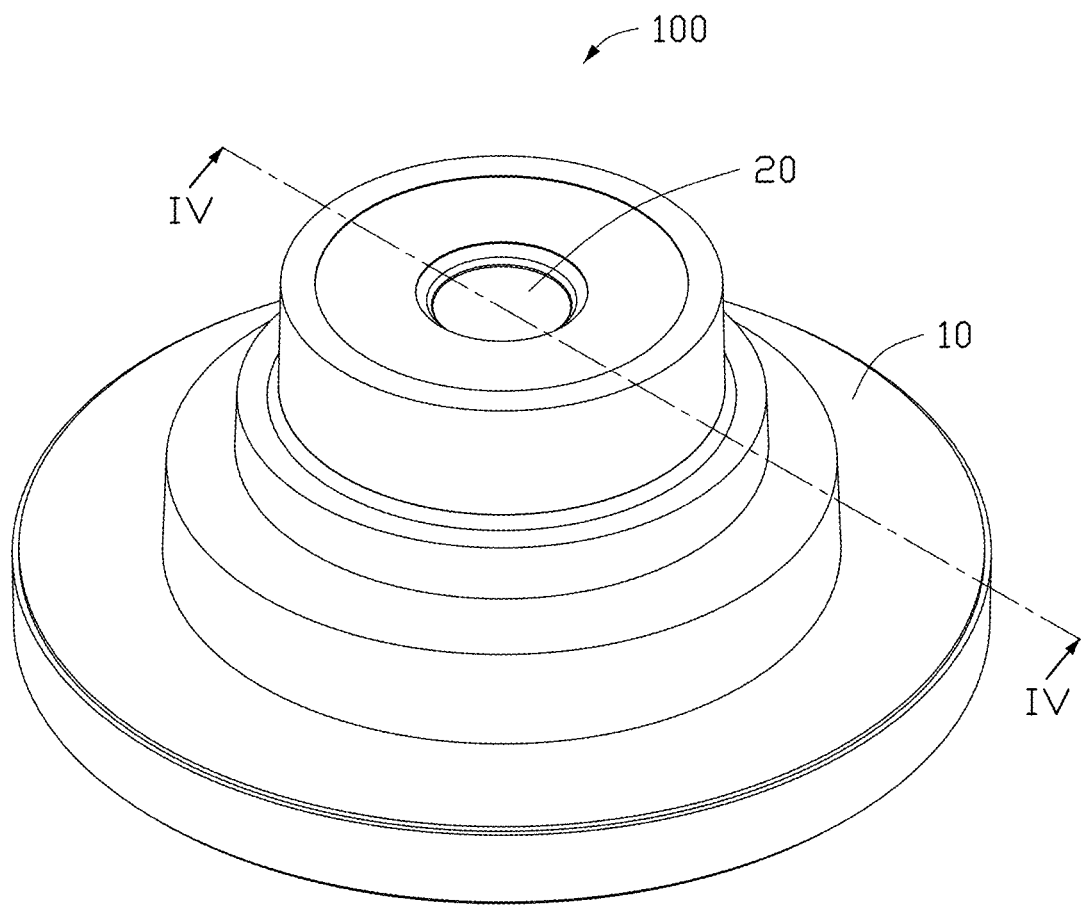
FIG. 1 is an assembled, isometric view of an embodiment of a lens assembly.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series and the like.

Figure 2:
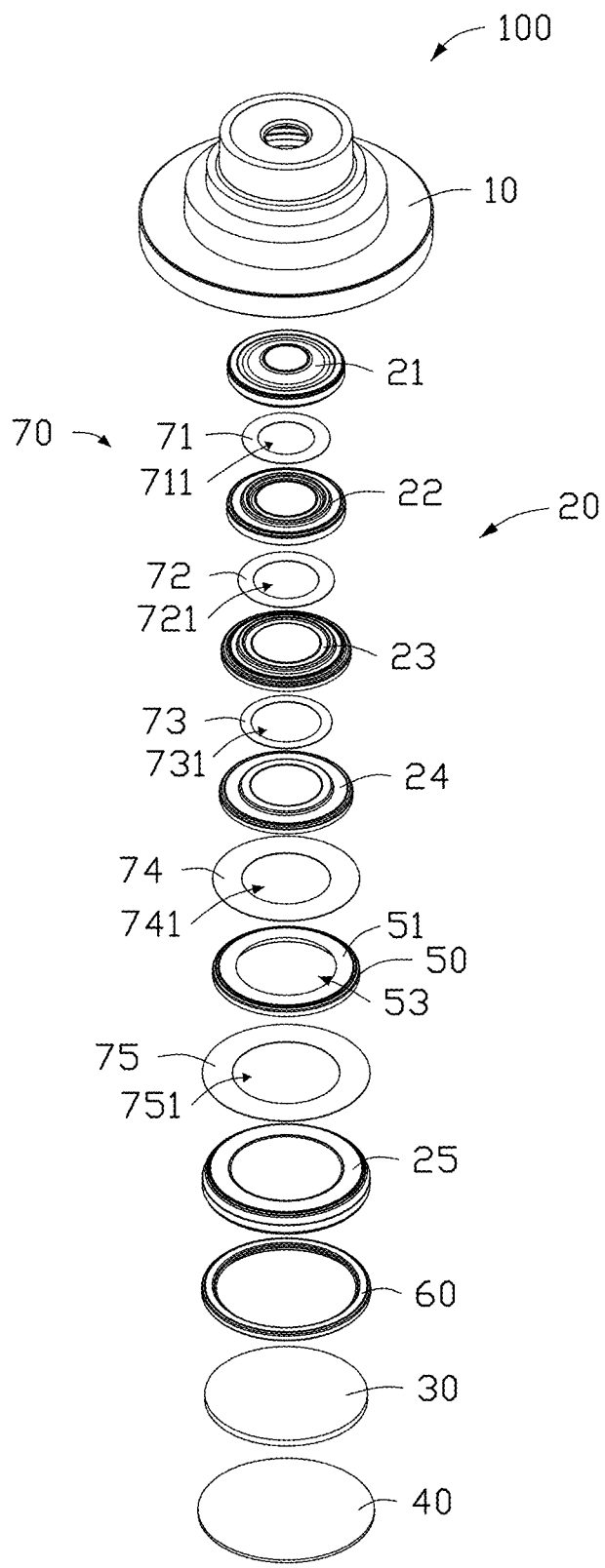
FIG. 2 is an exploded, isometric view of the lens assembly in FIG. 1.

FIG. 1 and FIG. 2 show an embodiment of a lens assembly 100. The lens assembly 100 includes a lens barrel 10, a lens group 20, a filter 30, an image sensor 40, a gasket 50, a retaining ring 60, and a light shielding group 70.

The lens group 20, the filter 30, and the image sensor 40 are sequentially arranged along a direction from an object side of the lens assembly 100 to an image side of the lens assembly 100.

The lens group 20 is fixedly housed in the lens barrel 10 and includes a plurality of lenses. The gasket 50 is located between two lenses on a light exiting side of the lens assembly 100. The retaining ring 60 is located between a lens on the light exiting side and the filter 30. The light shielding group 70 includes a plurality of shielding sheets located between the lens group 20 and the gasket 50.

In one embodiment, the lens group 20 includes a first lens 21, a second lens 22, a third lens 23, a fourth lens 24, and a fifth lens 25 arranged in sequence from the object side of the lens assembly 100 to the image side of the lens assembly 100.

In one embodiment, the first lens 21 has a positive refracting power. The first lens 21 includes a first convex surface on the object side and a second convex surface on the image side. The first surface and the second surface are both convex surfaces.

In one embodiment, the second lens 22 has a negative refracting power. The second lens 22 includes a third surface on the object side and a fourth surface on the object side. The third surface is a convex surface, and the fourth surface is a concave surface. For example, a curvature of the fourth surface is larger than a curvature of the third surface.

In one embodiment, the third lens 23 does not have a refracting power. The third lens 23 includes a fifth surface and a sixth surface on the object side. The fifth surface is a convex surface, and the sixth surface is a concave surface. The fifth surface and the sixth surface have a same curvature.

In one embodiment, the fourth lens 24 has a positive refracting power. The fourth lens 24 includes a seventh surface and an eight surface on the image side. The seventh surface is a concave surface, and the eighth surface is a convex surface. A curvature of the seventh surface is smaller than a curvature of the eighth surface.

In one embodiment, the fifth lens 25 has a negative refracting power. The fifth lens 25 includes a ninth surface and a tenth surface. The ninth surface and the tenth surface are both recurved aspherical surfaces.

In one embodiment, the gasket 50 is located between the fourth lens 24 and the fifth lens 25 to maintain an air gap between the fourth lens 24 and the fifth lens 25. The gasket 50 includes a first side surface 51 and a second side surface 52 (shown in FIG. 4) parallel to the first side surface 51. The first side surface 51 faces the fourth lens 24, and the second side surface 52 faces the fifth lens 25. An inner portion of the gasket 50 defines an inner hole 53 for transmitting light. A diameter of the inner hole 53 increases from the object side to the image side along a direction from the first side surface 51 to the second side surface 52.

In one embodiment, the retaining ring 60 is located between the fifth lens 25 and the filter 30 and fixed in the lens barrel 10 to limit the lens group 20 within the lens barrel 10. An outer diameter of the retaining ring 60 matches an inner diameter of an inner wall of the lens barrel 10 to meet an air gap size of optical design.

In one embodiment, the light shielding group 70 includes a first shielding sheet 71, a second shielding sheet 72, a third shielding sheet 73, a fourth shielding sheet 74, and a fifth shielding sheet 75. The first shielding sheet 71, the second shielding sheet 72, the third shielding sheet 73, the fourth shielding sheet 74, and the fifth shielding sheet 75 are located in sequence from the object side of the lens assembly 100 to the image side of the lens assembly 100. A first through hole 711, a second through hole 721, a third through hole 731, a fourth through hole 741, and a fifth through hole 751 are respectively defined in a middle portion of the first shielding sheet 71, the second shielding sheet 72, the third shielding sheet 73, the fourth shielding sheet 74, and the fifth shielding sheet 75 for transmitting light. The first shielding sheet 71 is located between the first lens 21 and the second lens 22. The second shielding sheet 72 is located between the second lens 22 and the third lens 23. The third shielding sheet 73 is located between the third lens 23 and the fourth lens 24. The fourth shielding sheet 74 is located between the fourth lens 24 and the gasket 50. The fifth shielding sheet 75 is located between the gasket 50 and the fifth lens 25.

Figure 4:
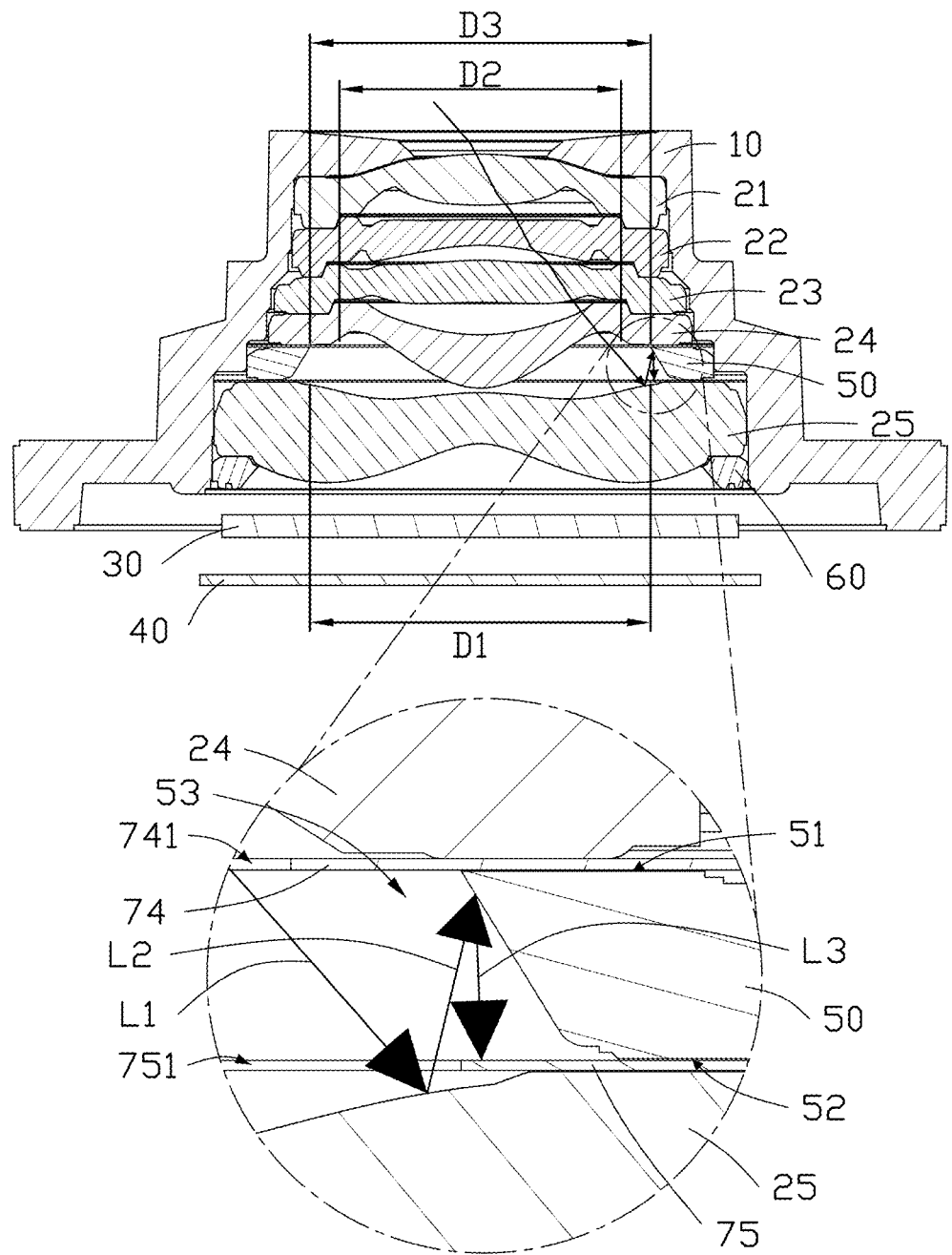
FIG. 4 is a cross-sectional view taken along line IV-IV in FIG. 1.

As shown in FIG. 4, the fourth through hole 741 has an aperture D1. A diameter of an inner wall of the inner hole 53 contacting the first side surface 51 has an aperture D2. The fifth through hole 751 has an aperture D3. D1, D2, and D3 satisfy the following relationships:

0.65<D1/D2<0.85, incident light is blocked by the fourth shielding sheet 74;

D3≤D2, reflected light is blocked by the fifth shielding sheet 75; and

D1/D2 is 0.826, and D3=D2.

For example, in one embodiment, D1 is 2.61 mm, D2 is 3.16 mm, and D3 is 3.16 mm.

Figure 3:
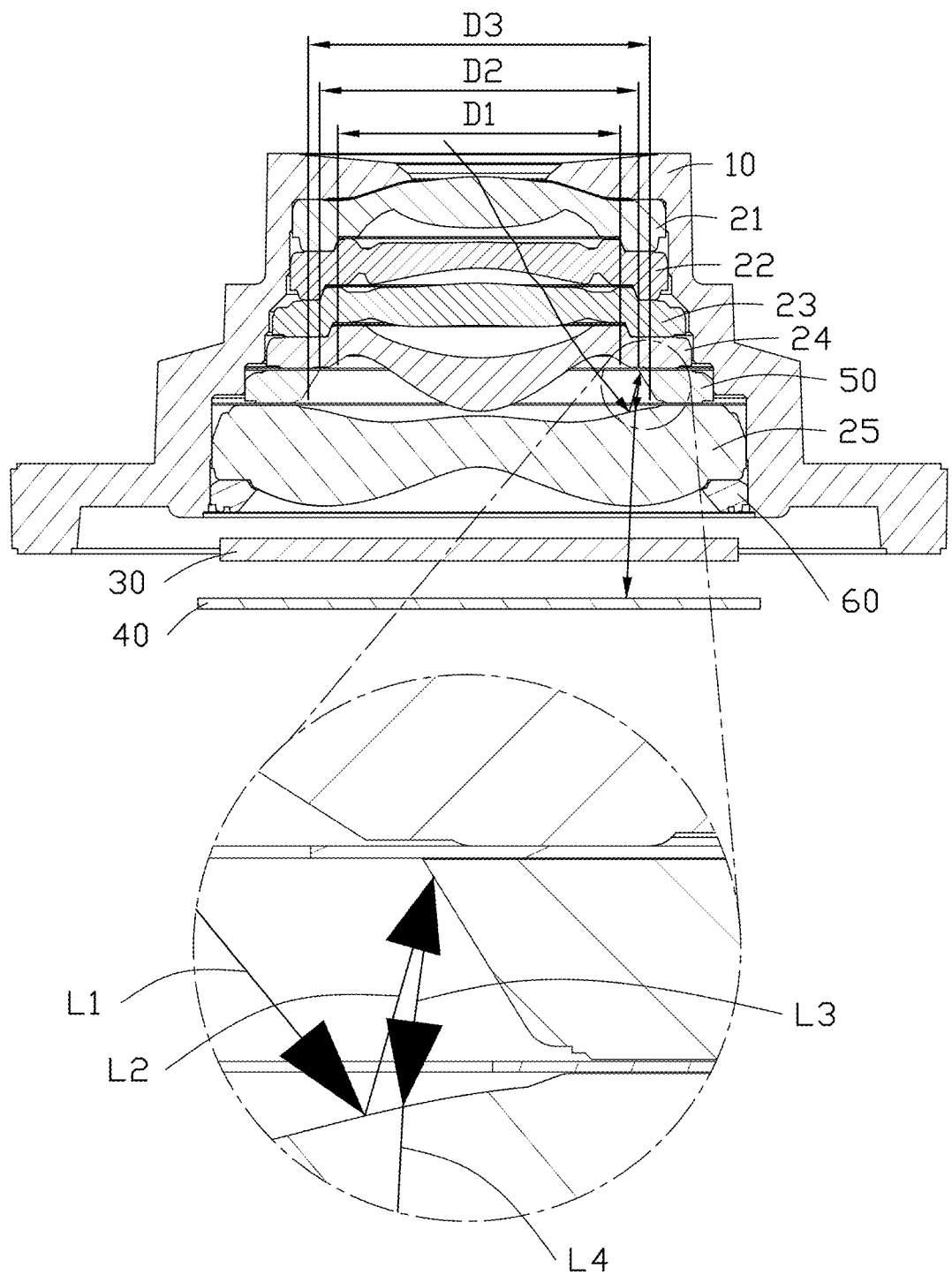
FIG. 3 is a cross-sectional view of a lens assembly in the related art.
Figure 5:
FIG. 5 is an image of light captured by a lens assembly in the related art.

In the related art as shown in FIGS. 3 and 5, an inner diameter of the inner hole of the gasket is smaller than an inner diameter of the through hole of the light shielding sheet near the image side. An incident ray L1 is reflected by the lens to generate a reflected ray L2. The reflected ray L2 reflects on an inner wall of the gasket to generate a secondary reflected ray L3. The secondary reflected ray L3 enters the fifth lens 25 to generate a transmitted ray L4. Thus, the light is reflected multiple times and generates stray light which enters the image sensor.

Figure 6:
FIG. 6 is an image of light captured by the lens assembly in the present disclosure.

Referring to FIGS. 4 and 6, in the present disclosure, an incident ray L1 is reflected on the ninth surface of the fifth lens 25 to generate a reflected ray L2, and the reflected ray L2 reflects on an inner wall of the inner hole 53 of the gasket 50 to generate a secondary reflected ray L3. The secondary reflected ray L3 is blocked by the fifth shielding sheet 75 from being transmitted through the fifth lens 25 and entering the image sensor 40, thereby reducing an amount of stray light.

By comparing FIG. 5 to FIG. 6, it can be seen that the inner hole 53 of the gasket 50 is matched with the through hole of the light shielding group 70, so that stray light is shielded and does not enter the image sensor 40, thereby improving a performance of the lens assembly 100.

Figure 7:
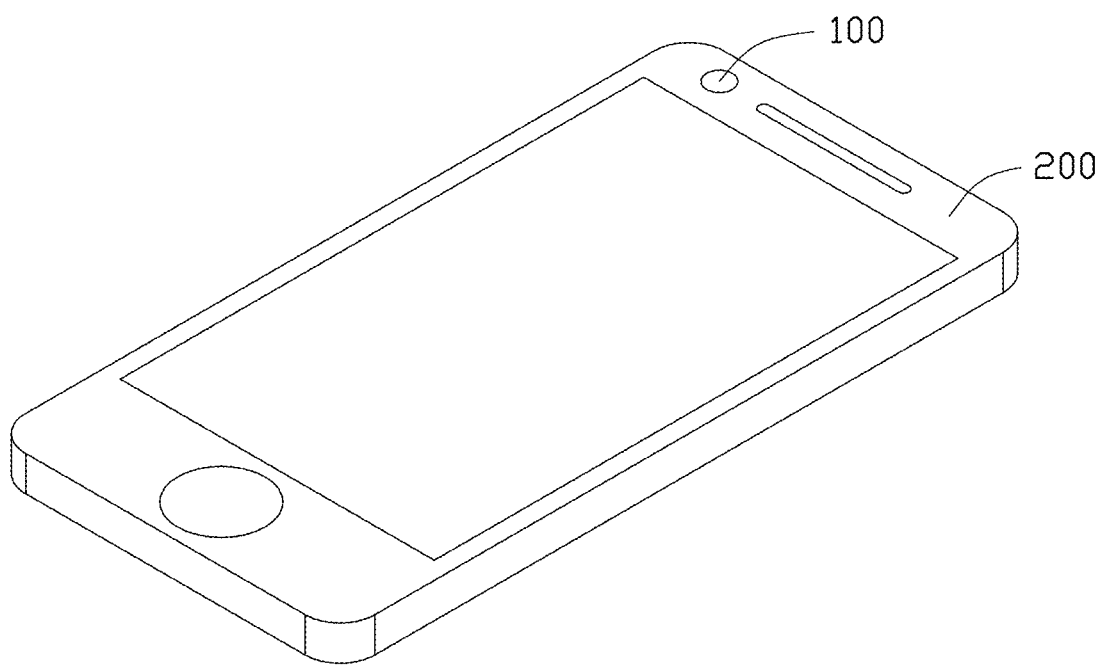
FIG. 7 is an isometric view of an electronic device having the lens assembly.

As shown in FIG. 7, the present disclosure further provides an electronic device 200 including the lens assembly 100. The electronic device 200 can be a mobile phone, a notebook computer, a desktop computer, a tablet computer, or the like.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A lens assembly comprising:
a lens barrel;
a lens group fixedly housed in the lens barrel, the lens group being composed of a first lens, a second lens, a third lens, a fourth lens, and a fifth lens arranged in sequence from an object side of the lens assembly to an image side of the lens assembly, the first lens having a positive refracting power, the second lens having a negative refracting power, the third lens having no refracting power, the fourth lens having a positive refracting power, and the fifth lens having a negative refracting power;
a filter;
an image sensor;
a gasket; and
a light shielding group comprising a plurality of shielding sheets located between the lens group and the gasket, each of the plurality of shielding sheets defining a through hole configured for transmitting light; wherein:
the lens group, the filter, and the image sensor are sequentially arranged along a direction from the object side of the lens assembly to the image side of the lens assembly;
the gasket is located between the fourth lens and the fifth lens to maintain an air gap between the fourth lens and the fifth lens;
an inner portion of the gasket defines an inner hole for transmitting light;
an aperture of the inner hole increases from the object side to the image side;
the aperture of the through hole adjacent to the gasket and adjacent to the object side is defined as D1;
an aperture of the inner hole adjacent to the object side is defined as D2;
an aperture of the through hole adjacent to the gasket and adjacent to the image side is defined as D3; and
D1, D2, and D3 satisfy a relationship 0.65<D1/D2<0.85; and D3<D2.

2. The lens assembly of claim 1, wherein:
D1/D2 is 0.826, and D3=D2.

3. The lens assembly of claim 2, wherein:
D1 is 2.61 mm;
D2 is 3.16 mm; and
D3 is 3.16 mm.

4. The lens assembly of claim 1, wherein:
the gasket comprises a first side surface and a second side surface parallel to the first side surface;
the first side surface faces the fourth lens;
the second side surface faces the fifth lens;
a diameter of the inner hole increases from the object side to the image side along a direction from the first side surface to the second side surface; and
a diameter of an inner wall of the inner hole contacting the first side surface is the aperture D2.

5. The lens assembly of claim 1, wherein:
the light shielding group comprises a first shielding sheet, a second shielding sheet, a third shielding sheet, a fourth shielding sheet, and a fifth shielding sheet located in sequence from the object side of the lens assembly to the image side of the lens assembly;
a first through hole, a second through hole, a third through hole, a fourth through hole, and a fifth through hole are respectively defined in a middle portion of the first shielding sheet, the second shielding sheet, the third shielding sheet, the fourth shielding sheet, and the fifth shielding sheet;
the first shielding sheet is located between the first lens and the second lens;
the second shielding sheet is located between the second lens and the third lens;
the third shielding sheet is located between the third lens and the fourth lens;

the fourth shielding sheet is located between the fourth lens and the gasket;
the fifth shielding sheet is located between the gasket and the fifth lens;
a diameter of the fourth through hole is the aperture D1; and
a diameter of the fifth through hole is the aperture D3.

6. The lens group of claim 1, further comprising a retaining ring, wherein:
the retaining ring is located between the fifth lens and the filter and fixed in the lens barrel to limit the lens group within the lens barrel.

7. The lens group of claim 6, wherein:
an outer diameter of the retaining ring matches an inner diameter of an inner wall of the lens barrel; and
the retaining ring is located between the fifth lens and the filter.

8. An electronic device comprising a lens assembly, the lens assembly comprising:
a lens barrel;
a lens group fixedly housed in the lens barrel, the lens group being composed of a first lens, a second lens, a third lens, a fourth lens, and a fifth lens arranged in sequence from an object side of the lens assembly to an image side of the lens assembly, the first lens having a positive refracting power, the second lens having a negative refracting power, the third lens having no refracting power, the fourth lens having a positive refracting power, and the fifth lens having a negative refracting power;
a filter;
an image sensor;
a gasket; and
a light shielding group comprising a plurality of shielding sheets located between the lens group and the gasket, each of the plurality of shielding sheets defining a through hole configured for transmitting light; wherein:
the lens group, the filter, and the image sensor are sequentially arranged along a direction from the object side of the lens assembly to the image side of the lens assembly;
the gasket is located between the fourth lens and the fifth lens to maintain an air gap between the fourth lens and the fifth lens;
an inner portion of the gasket defines an inner hole for transmitting light;
an aperture of the inner hole increases from the object side to the image side;
the aperture of the through hole adjacent to the gasket and adjacent to the object side is defined as D1;
an aperture of the inner hole adjacent to the object side is defined as D2;
an aperture of the through hole adjacent to the gasket and adjacent to the image side is defined as D3; and
D1, D2, and D3 satisfy a relationship $0.65<D1/D2<0.85$; and $D3 \leq D2$.

9. The electronic device of claim 8, wherein:
D1/D2 is 0.826, and D3=D2.

10. The electronic device of claim 9, wherein:
D1 is 2.61 mm;
D2 is 3.16 mm; and
D3 is 3.16 mm.

11. The electronic device of claim 8, wherein:
the gasket comprises a first side surface and a second side surface parallel to the first side surface;
the first side surface faces the fourth lens;
the second side surface faces the fifth lens;
a diameter of the inner hole increases from the object side to the image side along a direction from the first side surface to the second side surface; and
a diameter of an inner wall of the inner hole contacting the first side surface is the aperture D2.

12. The electronic device of claim 8, wherein:
the light shielding group comprises a first shielding sheet, a second shielding sheet, a third shielding sheet, a fourth shielding sheet, and a fifth shielding sheet located in sequence from the object side of the lens assembly to the image side of the lens assembly;
a first through hole, a second through hole, a third through hole, a fourth through hole, and a fifth through hole are respectively defined in a middle portion of the first shielding sheet, the second shielding sheet, the third shielding sheet, the fourth shielding sheet, and the fifth shielding sheet;
the first shielding sheet is located between the first lens and the second lens;
the second shielding sheet is located between the second lens and the third lens;
the third shielding sheet is located between the third lens and the fourth lens;
the fourth shielding sheet is located between the fourth lens and the gasket;
the fifth shielding sheet is located between the gasket and the fifth lens;
a diameter of the fourth through hole is the aperture D1; and
a diameter of the fifth through hole is the aperture D3.

13. The electronic device of claim 8, further comprising a retaining ring, wherein:
the retaining ring is located between the fifth lens and the filter and fixed in the lens barrel to limit the lens group within the lens barrel.

14. The electronic device of claim 13, wherein:
an outer diameter of the retaining ring matches an inner diameter of an inner wall of the lens barrel; and
the retaining ring is located between the fifth lens and the filter.

* * * * *